Nov. 11, 1969  MASASHI NAITO  3,477,156
IDENTIFICATION SYSTEM

Filed April 4, 1967  3 Sheets-Sheet 1

INVENTOR.
MASASHI NAITO

BY Steinberg & Blake

ATTORNEYS

FIG. 5
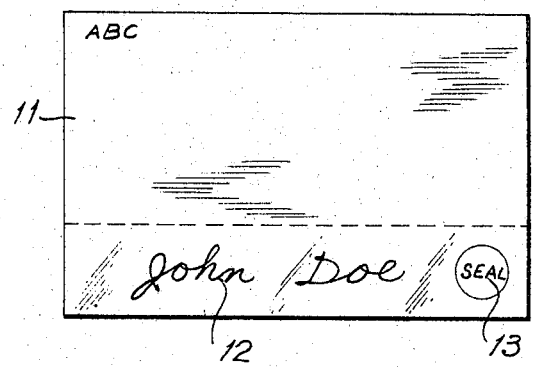
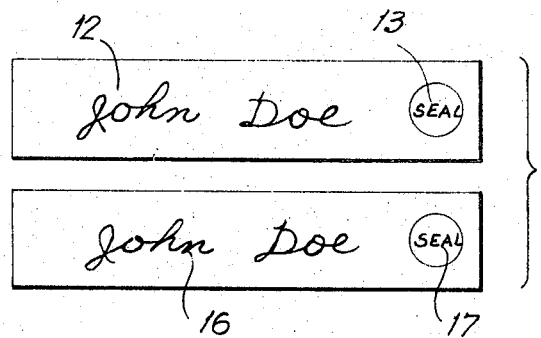
FIG. 6

Nov. 11, 1969 MASASHI NAITO 3,477,156
IDENTIFICATION SYSTEM

Filed April 4, 1967 3 Sheets-Sheet 3

INVENTOR.
MASASHI NAITO
BY Steinberg & Blake
ATTORNEYS

United States Patent Office 3,477,156
Patented Nov. 11, 1969

3,477,156
IDENTIFICATION SYSTEM
Masashi Naito, Tokyo-to, Japan, assignor, by mesne assignments, to Eizo Komiyama, Ichikawa-shi, Chiba-ken, Japan
Filed Apr. 4, 1967, Ser. No. 628,483
Claims priority, application Japan, Sept. 5, 1966, 41/58,193, 41/58,194
Int. Cl. G09f 3/02; B42d 15/00
U.S. Cl. 40—2.2
9 Claims

ABSTRACT OF THE DISCLOSURE

An identification system such as a credit card system where a sheet, such as a card, carries indicia identifying the individual to whom the card was issued. The identifying indicia on the sheet is covered by a filter which is permeable only to light of a wave-length which is beyond the visible spectrum, so that the filter appears opaque in the visible spectrum and renders the identifying indicia covered by the filter invisible except when exposed to the light which is of a wave length beyond the visible spectrum.

BACKGROUND OF THE INVENTION

At the present time there are known identification systems which enable an individual to carry out financial transactions without using cash. For example, many different types of retail establishments, restaurants, and the like will honor so-called credit cards which have identifying indicia thereon, simply by comparing the latter indicia with indicia which is placed by the bearer of the card on a sales slip or the like.

Also, in the case of savings banks, for example, it is customary for a depositor to have a passbook in which an account of his deposits with the bank are kept, and when a deposit or withdrawal is to be made, the depositor customarily fills out a suitable form which is presented to the bank with the passbook. Particularly in the case of a withdrawal, the identifying indicia, such as the signature of the depositor, is placed on the form and then compared by an employee of the bank with a signature which is kept on file by the bank, so as to provide some degree of assurance that the withdrawal is being made by the properly authorized individual.

Identification systems of this general type suffer from the serious drawback of greatly increasing the risk of unauthorized use of a credit card, passbook or the like when any identifying device of this latter type becomes lost and falls into the hands of unscrupulous individuals. For this reason banks, retail establishments, and the like which utilize such identification systems require immediate notification of the loss of the identifying cards, passbook, or the like. Thus, there is an unavoidable interim until the owner of the card, passbook, or the like becomes aware of the loss thereof and notifies the establishment which issued the card, passbook or the like, and during this interim it is possible for people other than the proper owner to make use of the card, passbook, or the like. Particularly in connection with banks, although their systems of keeping accounts have been streamlined and improved by the use of computers instead of ledgers, nevertheless passbooks are still utilized so that the above problem still exists even in the case of banks.

SUMMARY OF THE INVENTION

It is accordingly a primary object of the invention to provide an identification system which will avoid the above drawbacks to a very great extent.

Thus, it is an object of the invention to provide an identification system which will greatly reduce the possibility of unauthorized use of a lost credit card, passbook or the like.

In particular, it is an object of the invention to provide a system of this type which requires an individual to carry on his person only a sheet in the form of a card which is used for identification purposes, so that the system of the invention is as convenient to the individuals who use the system as any presently known identification systems.

A more particular object of the present invention is to provide an identification system wherein identifying indicia is invisible when exposed to light whose wave-length is in the visible spectrum.

Thus, the objects of the present invention include the provision of an identification system wherein identifying indicia will be rendered visible only when exposed to light of a wave-length which is beyond the visible spectrum.

In accordance with the invention the sheet which may take the form of a suitable card carries a means, which includes identifying indicia, for rendering the latter indicia visible only when exposed to light of a wave-length which is beyond the visible spectrum. The indicia itself may take the form of a signature and/or seal, or the like, which is placed on the card with any suitable ink, for example, which is of a color which is visible in the visible spectrum, and this identifying indicia is covered, in accordance with the invention with a filter which is permeable only to light of a wave-length which is beyond the visible spectrum, so that the filter appears opaque in the visible spectrum and renders the identifying indicia invisible in the visible spectrum. Thus, an infrared filter is located on the card covering the identifying indicia so that when the card is positioned to receive light from a means for directing infrared light onto the card, this light will pass through the filter and will be reflected by the card, a viewing means being situated in the path of the reflected light to render the identifying indicia visible. When utilizing this system of the invention in a retail establishment, restaurant, bank, or the like, the holder of the card will apply the identifying indicia to a suitable form which can also be exposed to the infrared light so that the viewing means can be used to render not only the identifying indicia on the card visible but also for viewing the identifying indicia placed on the form, and thus both sets of indicia can be readily compared to provide assurance that an authorized use is made of the identification card, sheet, or the like.

BRIEF DESCRIPTION OF THE DRAWINGS

The invention is illustrated by way of example in the accompanying drawings which form part of this application and in which:

FIG. 5 is an illustration of the card of FIG. 2 without the covering filter thereon;

FIG. 6 is a schematic representation of what is seen in the viewing means when a comparison of a pair of identifying indicia is carried out;

DESCRIPTION OF PREFERRED EMBODIMENTS

Figure 1:
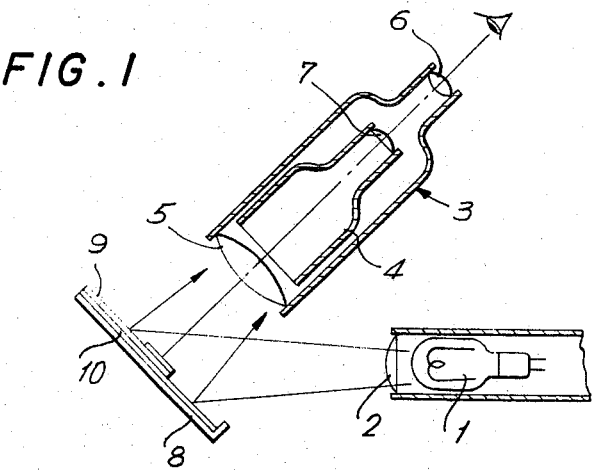
FIG. 1 is a schematic representation of one possible embodiment of an identification system of the invention.
Figure 2:
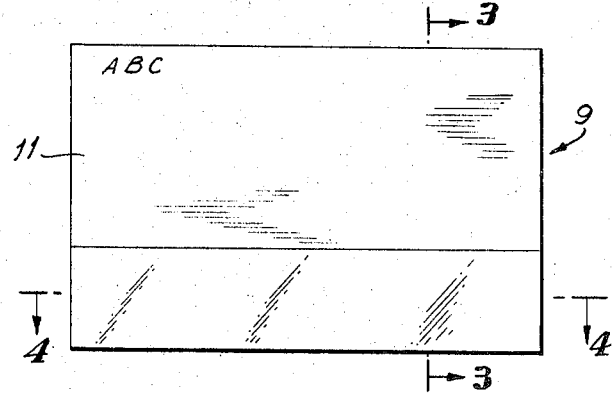
FIG. 2 shows in elevation one possible embodiment of an identification card of the invention.
Figure 3:
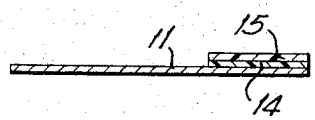
FIG. 3 is a sectional view of the structure of FIG. 2 taken along line 3—3 of FIG. 2 in the direction of the arrows.
Figure 4:
FIG. 4 is a sectional view of the structure of FIG. 2 taken along line 4—4 of FIG. 2 in the direction of the arrows.
Figure 7:
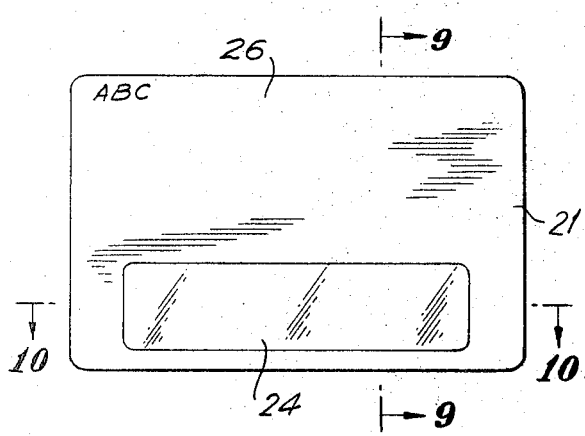
FIG. 7 illustrates another embodiment of an identifying card of the invention.
Figure 9:
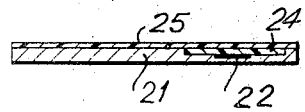
FIG. 9 is a transverse section of the structure of FIG. 7 taken along line 9—9 of FIG. 7 in the direction of the arrows.
Figure 10:
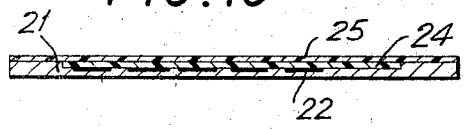
FIG. 10 is a longitudinal section of the structure of FIG. 7 taken along line 10—10 of FIG. 7 in the direction of the arrows.
Figure 8:
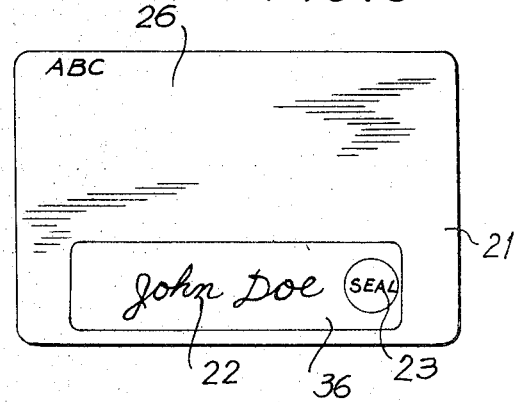
FIG. 8 shows the card of FIG. 7 without the covering filter.
Figure 11:
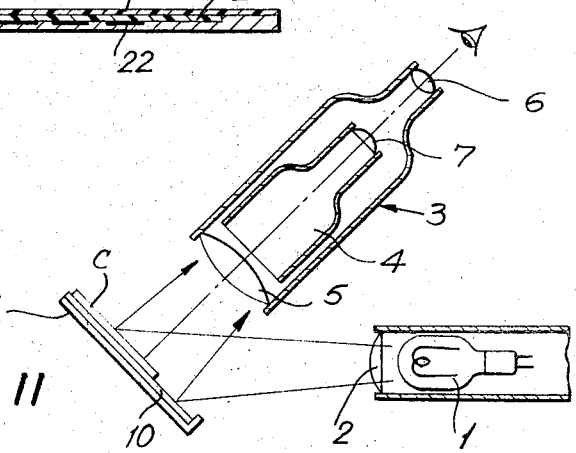
FIG. 11 is a schematic representation of the manner in which the card of FIG. 7 is used in the identification system of the invention.

FIG. 1 of the drawings shows a system of the invention which makes use of infrared rays. This system includes a means for directing infrared light onto an identification card and a suitable form which has been filled out by the bearer of the card. This means for directing the infrared light includes the infrared lamp 1 which is a source of infrared light and which is connected in any suitable way to an electrical supply, this latter means further including a condensing lens 2 which is situated in front of the lamp 1, the components 1 and 2 being situated in a suitable housing with the lens 2 exposed at the front of the housing so that the infrared rays will be directed toward the left, as viewed in FIG. 1.

The infrared rays are reflected to a viewing means 3 which receives the infrared rays. This viewing means will convert the infrared rays into a visible condition and includes an objective 5 located at the lower open end of a suitable housing of the viewing means 3. At the end of the housing distant from the objective 5 is located an ocular 6, and along the common optical axis of the objective 5 and the ocular 6 is situated, between the objective 5 and the ocular 6 within the housing of the viewing means 3, a screen 7 on which an image is formed, so that this image is visible when the operator looks through the ocular 6. The screen 7 is situated at the upper end of an image tube 4 which receives the light from the objective 5 and provides an image on the screen 7. This image tube 4 is mounted in any suitable way within the housing of the viewing means 3, as indicated schematically in FIG. 1.

In the path of the infrared rays issuing from the lamp 1 and the condensing lens 2 is situated a support means 8 in the form of a suitable card stage. This support means 8 can be any rigid plate having the inclined position indicated in FIG. 1 and carried by any suitable mounting structure with the plate having at its lower edge an upwardly directed flange or ledge which will retain sheets on the plate 8.

The operator places on the support means 8 a form 10 such as a sales slip in the case of a retail establishment or a deposit or withdrawal form in the case of a bank, and over the slip 10, above identifying indicia thereon, is located a comparison card 9 which forms the identification card of the invention which is used with the system of the invention which is shown in FIG. 1. Thus, the bearer of the card or sheet 9 will have placed the identifying indicia, in the form of a signature and/or seal or the like on the form 10, and then the card 9 is placed together with the form 10 on the support means 8 so that the infrared light will be reflected from the card 9 and the uncovered portion of the form 10 to the objective 5.

The details of the identification sheet or card 9 are illustrated in FIGS. 2–5. This structure may include a sheet or card 11 having an upper light-reflecting surface. For this purpose the sheet or card 11 may, for example, simply be made of white paper. At its lower portion (FIG. 5) the card or sheet 11 carries indicia which may take the form, for example, of a signature 12 and/or a seal 13 which may, for example, be a seal which is registered with a bank or the like. The indicia 12, 13 forms part of a means for identifying the individual to whom the card 9 was issued, and this means includes, in addition to the indicia 12, 13, an infrared filter 14 applied to the upper face of the sheet 11 at a location covering the indicia 12, 13. For example, the filter 14 may take the form of a suitable film, sheet, or the like, of suitable dimensions fastened in any suitable way to the upper surface of the card 11 as by being adhesively connected thereto with a suitable transparent cement, for example, and thus the infrared filter serves to cover the indicia 12, 13 and remains permanently connected with the card. In order to protect the filter 14, this filter itself is covered with a transparent film or sheet 15 which is thus a transparent filter and which may be connected to the exposed upper surface of the filter 14 in any suitable way as by use of a suitable transparent cement.

When use is made of the system of the invention, the bearer of the card 9 will place on the form 10 the indicia 16, 17 which appears in FIG. 6, and when the form 10 and the card 9 are placed on the support means 8 in the position shown in FIG. 1, the operator when looking through the ocular 6 will see at the screen 7 images having the appearance indicated in FIG. 6, so that a ready comparison can be made between the indicia which has been placed in the presence of the operator on the form 10 and the indicia which is situated on the identification card beneath the filter 14.

The indicia 12, 13 as well as the indicia 16, 17 can have a color which is in the visible spectrum. For example, India ink may be used for the indicia 12, 13 and 16, 17. Such ink is incapable of being penetrated by the infrared light so that the latter will be absorbed by this ink. When using the system of the invention the operator will place the form 10 on the support 8 with the car 9 overlapping the form 10 and the indicia 16, 17 situated beneath the card 9. Then the operator will energize the lamp 1 so that infrared rays issuing therefrom will pass through the condensing lens 2 onto the identification card 9 and the form 10. This light is reflected by the sheet which constitutes the form 10 and the card 9 but is absorbed by the indicia 16, 17 of the sheet 10. As for the sheet which constitutes the card 9, the infrared rays will pass through and even be reflected to some extent by the transparent filter 15 and the infrared filter 14, while in this case also the infrared light will be absorbed by the indicia 12, 13. Of course, the light will also be reflected from the remaining exposed surface of the card 9. As a result, the operator will see at the screen 7 the reflected rays, except for the absorbed outlines which correspond to the indicia 12, 13 and 16, 17, so that images of the latter indicia will be readily visible at the screen 7. Therefore, it is a simple matter for the operator to compare the indicia 16, 17 with the indicia 12, 13.

In the embodiment of the invention which is illustrated in FIGS. 7–11, the card C (FIG. 11) includes a card body 21 formed from any suitable sheet material and having a reflecting surface 26. For example, the sheet or card 21 may be white, so that the surface 26 thereof will have the property of reflecting light. Along its lower edge portion, the sheet 21 is formed at its upper surface with a recess 36 (FIG. 8), and in this recess is situated the identifying indicia 22, 23 in the form of a suitable signature and seal, for example. This indicia 22, 23 forms part of a means which is carried by the sheet or card C for identifying the individual to whom the sheet or card was issued. This latter means further includes the infrared filter 24 which is located in the recess 36 over and covering the indicia 22, 23. The upper surface of the filter 24 is flush with the surface 26 in this embodiment. Instead of locating the indicia 22, 23 directly on the surface of the card in the recess 36 thereof, it is possible for this indicia to be located on a suitable sheet having the configuration of the recess 36, and then this latter sheet can be placed in the bottom of the recess 36 beneath the filter 24. In this way it is possible to eliminate any inconvenience in entering the signature 22 and seal 23 in the interior of the recess 36. In order to protect the filter 24 it is covered by a transparent film 25 which extends over the entire surface 26, as is apparent from FIGS. 9 and 10, so that in this way the entire card is protected by the transparent film 25, and a portion of the surface 26 which is situated beyond the recess 36 may have any desired information printed or otherwise applied thereto beneath the protectivet film 25. This film may be applied in any suitable way to the surface 26 and the upper surface of the filter 24.

This embodiment of the invention will be used in the same way as the embodiment of FIGS. 2–5. Thus, as may be seen from FIG. 11, the card C is placed on the sheet 10 after the latter has been placed on the support means 8, and this support means is situated with respect to the lamp 1 and the condensing lens 2 in the same way as illustrated in FIG. 1 and described above. The reflected light is received also by a viewing means identical with that of FIG. 1, and since the indicia 22, 23 is composed of an ink or the like which will absorb the infrared rays, the image of this indicia will be visible directly above the indicia 16, 17 shown in FIG. 6.

Thus, with the present invention the indicia 12, 13 or 22, 23 cannot be seen in the visible spectrum. Since this indicia is covered by an infrared filter which appears opaque in the visible spectrum, if the identification card of the invention should be lost, a person finding the same will see nothing on the card to indicate the owner thereof. At the same time, however, the card can be used in much the same way as any credit card in all types of retail establishments, restaurants, or the like so as to identify the bearer thereof.

In the case of banks, the depositor does not have any passbook. Instead the depositor has only an identification card of the same type as that which is used with any retail establishment, for example, except that the identifying indicia may be the seal of a bank, an account number, or the like. In this case when the card is presented to the bank with a suitable deposit or withdrawal form 10 on which the depositor has placed the identifying indicia, a comparison is made in precisely the same way as described above, and then from the records which are kept by way of a suitable computer structure, for example, it is possible to make the required deposits or withdrawals.

While the above-described specific embodiments of the invention are preferred because of their simplicity and low cost, it is apparent that the invention can be practiced with structures which utilize light rays of a wave-length beyond the visible spectrum of wave-lengths but not necessarily infrared light rays. For example, it is possible to use ultraviolet light rays or even X-rays. When using light of this latter type which is located beyond the visible spectrum it is also possible by the use of suitable filters or the like to render the identifying indicia visible only when exposed to light of a wave-length beyond the visible spectrum.

What is claimed is:

1. In an indication system, a sheet, and means, including identifying indicia, carried by said sheet for rendering said indicia visible only when exposed to light of a wavelength which is beyond the visible spectrum of wavelengths, so that said means is invisible except when exposed to said light, said indicia being of a color which is visible in the visible spectrum, said means further including a filter carried by said sheet and covering said indicia, said filter being permeable to said light while appearing opaque in the visible spectrum.

2. The combination of claim 1 and further including a means for directing light of said wavelength which is beyond the visible spectrum to said sheet for rendering said indicia visible.

3. The combination of claim 1 and wherein a transparent protective film covers said filter.

4. The combination of claim 1 and wherein said filter is an infrared filter so that said indicia will be rendered visible only when exposed to infrared light.

5. The combination of claim 3 and wherein said sheet is in the form of a card formed with a recess in which said indicia and said filter are located, said filter having an outer surface flush with an outer light-reflecting surface of said card, and said transparent protective film extending over said filter and said surface of said card.

6. The combination of claim 4 and wherein said indicia isc omposed of india ink.

7. The combination of claim 4, further including a means for directing infrared light onto said sheet through said filter to be reflected from said sheet along a given path, and viewing means situated at the latter path for viewing the reflected infrared light so that said indicia is rendered visible by said viewing means.

8. The combination of claim 7 wherein a support means is located in the path of infrared light issuing from said means for directing infrared light to said sheet for supporting said sheet at a location where it will receive infrared light to be reflected to said viewing means, so that a second sheet with identifying indicia thereon can also be positioned on said support means to have the latter indicia compared with the indicia which is visible only when exposed to the infrared light.

9. The combination of claim 8 and wherein said indicia is composed of india ink.

References Cited
UNITED STATES PATENTS

| | | | |
|---|---|---|---|
| 2,213,868 | 9/1940 | Lucian | 40—134 |
| 2,654,971 | 10/1953 | Harrison | 40—134 |
| 3,048,697 | 8/1962 | Cavanaugh | 283—7 |
| 3,245,697 | 4/1966 | Nugent | 283—7 |
| 3,279,826 | 10/1966 | Rudershausen | 283—7 |

EUGENE R. CAPOZIO, Primary Examiner

W. J. CONTRERAS, Assistant Examiner

U.S. Cl. X.R.

283—6